US010471957B2

(12) United States Patent
Niibe et al.

(10) Patent No.: US 10,471,957 B2
(45) Date of Patent: Nov. 12, 2019

(54) VEHICLE CONTROL APPARATUS CAPABLE OF GIVING CONTINUITY TO REACTIVE PERCEPTION QUANTITIES OF COOPERATIVE OPERATION PERCEIVED BY OCCUPANT

(71) Applicant: MAZDA MOTOR CORPORATION, Hiroshima (JP)

(72) Inventors: Tadayuki Niibe, Yawatahama (JP); Naoki Yamada, Hiroshima (JP); Kazuhiro Takemura, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 282 days.

(21) Appl. No.: 15/594,693

(22) Filed: May 15, 2017

(65) Prior Publication Data

US 2017/0334443 A1 Nov. 23, 2017

(30) Foreign Application Priority Data

May 18, 2016 (JP) ................................ 2016-099456

(51) Int. Cl.

*B60W 30/095* (2012.01)
*B60T 8/1755* (2006.01)

(Continued)

(52) U.S. Cl.

CPC ......... *B60W 30/0956* (2013.01); *B60T 7/042* (2013.01); *B60T 8/17558* (2013.01);

(Continued)

(58) Field of Classification Search

None

See application file for complete search history.

(56) References Cited

U.S. PATENT DOCUMENTS 6,661,403 B1 * 12/2003 Rosenberg .............. A63F 13/06 345/156
2007/0144814 A1 * 6/2007 Arnold .................. B62D 6/008 180/402

(Continued)

FOREIGN PATENT DOCUMENTS

CN 101028831 A 9/2007
CN 103223940 A 7/2013

(Continued)

OTHER PUBLICATIONS

An Office Action issued by the U.S. Patent Office dated Nov. 1, 2018, which corresponds to U.S. Appl. No. 15/594,701 and is related to U.S. Appl. No. 15/594,693.

(Continued)

*Primary Examiner* — Justin Holmes

(74) *Attorney, Agent, or Firm* — Studebaker & Brackett PC

(57) ABSTRACT

A vehicle control apparatus includes: a plurality of operation devices, a plurality of reaction applying devices, a plurality of driving devices, and control device. The control device is capable of controlling the plurality of reaction applying devices and the plurality of driving devices. When the occupant operates preceding operation devices and subsequently operates subsequent operation devices different from the preceding operation devices, the control device causes a reactive perception quantity that is perceived by the occupant when the occupant starts operating the subsequent operation devices to substantially match a reactive perception quantity that is perceived by the occupant when the occupant finishes operating the preceding operation devices.

18 Claims, 15 Drawing Sheets

(51) Int. Cl.

| | |
|---|---|
| ***G06F 17/12*** | (2006.01) |
| ***G06G 7/122*** | (2006.01) |
| ***B60T 7/04*** | (2006.01) |
| ***B62D 6/00*** | (2006.01) |
| *B60W 40/08* | (2012.01) |

(52) U.S. Cl.

CPC ......... *B60W 30/0953* (2013.01); *B62D 6/008* (2013.01); *G06F 17/12* (2013.01); *G06G 7/122* (2013.01); *B60W 2040/0872* (2013.01); *B60W 2710/0672* (2013.01)

(56) References Cited

U.S. PATENT DOCUMENTS

2007/0205040 A1 9/2007 Miyasaka et al.
2008/0015755 A1 1/2008 Kuwahara et al.
2008/0133066 A1* 6/2008 Takenaka ........... B60G 17/0195 701/1
2008/0294301 A1 11/2008 Kaigawa et al.
2012/0123655 A1 5/2012 Kurata
2014/0371992 A1* 12/2014 Di Cairano .......... B62D 5/0463 701/42
2015/0039198 A1 2/2015 Takeuchi et al.
2015/0142290 A1* 5/2015 Van Saanen ............. G05G 1/32 701/70
2015/0291210 A1 10/2015 Kageyama

FOREIGN PATENT DOCUMENTS

CN 203832404 U 9/2014
JP 4211056 B2 1/2009
JP 2011-143915 A 7/2011
JP 2015-214295 A 12/2015
WO 2011/013250 A1 2/2011

OTHER PUBLICATIONS

An Office Action mailed by The State Intellectual Property Office of the People's Republic of China dated Jan. 30, 2019, which corresponds to Chinese Patent Application No. 201710341483.5 and is related to U.S. Appl. No. 15/594,693.

An Office Action mailed by The State Intellectual Property Office of the People's Republic of China dated Feb. 15, 2019, which corresponds to Chinese Patent Application No. 201710341482.0 and is related to U.S. Appl. No. 15/594,693.

* cited by examiner

V
1
S
A
B
2
3
4
5
6
7
8
9
10
11
12
13
14
31
32
33
41
42
43
51
52
53

1
2
ECU
21
STORAGE UNIT
22
MOTOR CONTROL UNIT
23
CORRECTION UNIT
11
STEERING MOTOR
12
THROTTLE DRIVING MOTOR
13
PUMP DRIVING MOTOR
33
REACTION MOTOR
3
STEERING
43
REACTION MOTOR
4
ACCELERATOR
53
REACTION MOTOR
5
BRAKE
32
31
42
41
52
51

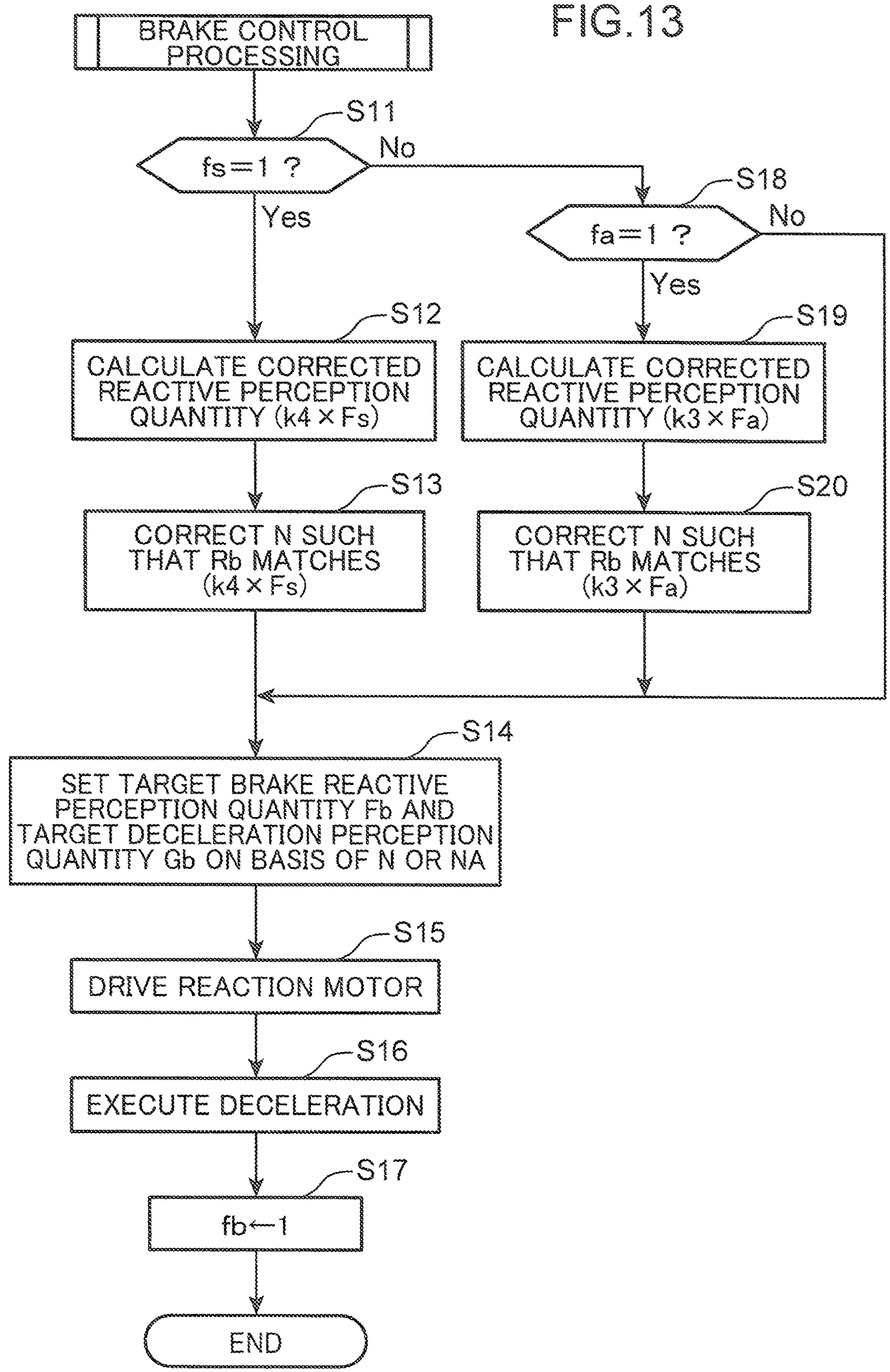
FIG.13
BRAKE CONTROL PROCESSING
S11
fs=1 ?
No
Yes
S18
fa=1 ?
No
Yes
S12
CALCULATE CORRECTED REACTIVE PERCEPTION QUANTITY (k4 × Fs)
S19
CALCULATE CORRECTED REACTIVE PERCEPTION QUANTITY (k3 × Fa)
S13
CORRECT N SUCH THAT Rb MATCHES (k4 × Fs)
S20
CORRECT N SUCH THAT Rb MATCHES (k3 × Fa)
S14
SET TARGET BRAKE REACTIVE PERCEPTION QUANTITY Fb AND TARGET DECELERATION PERCEPTION QUANTITY Gb ON BASIS OF N OR NA
S15
DRIVE REACTION MOTOR
S16
EXECUTE DECELERATION
S17
fb←1
END

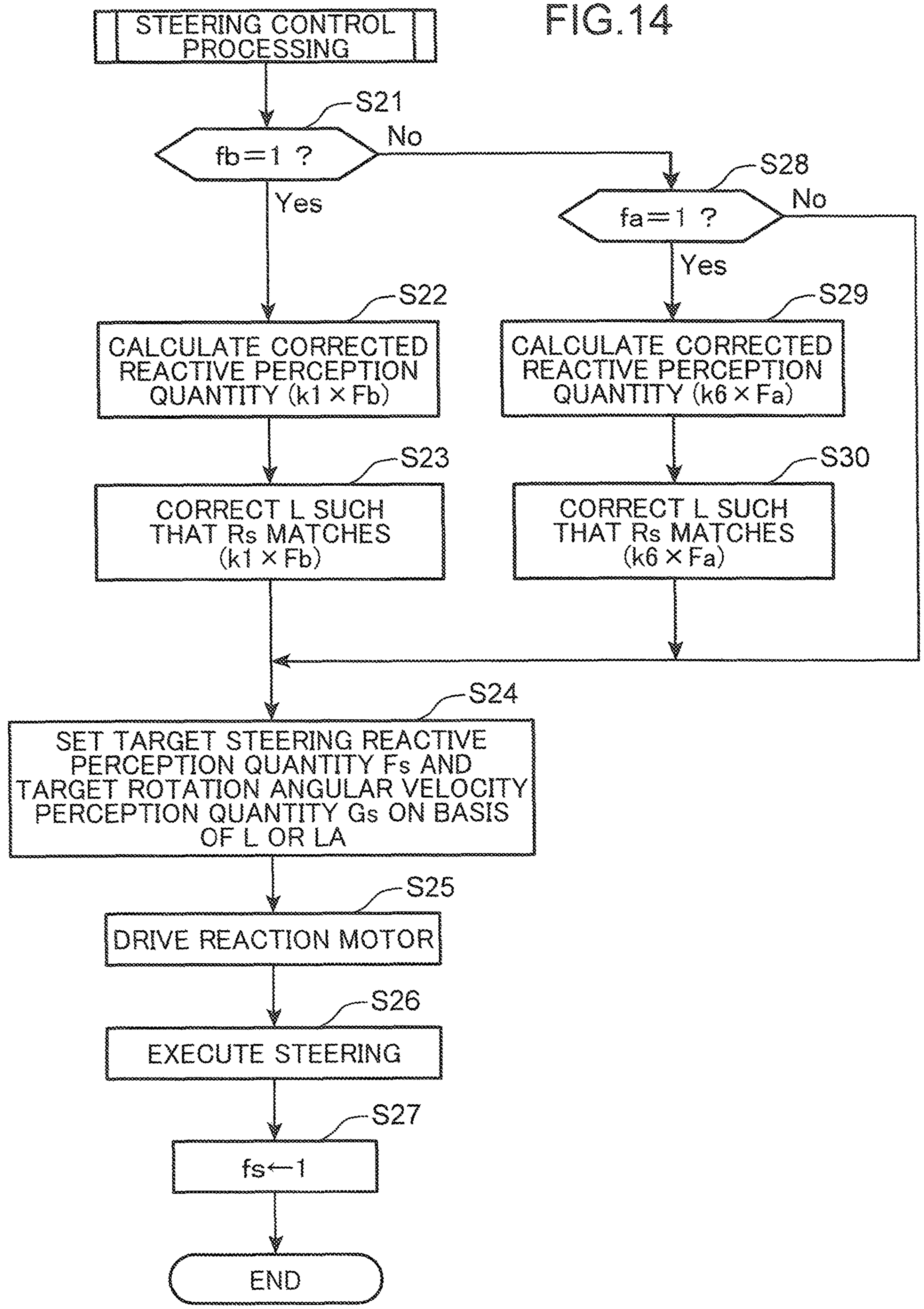

FIG.14
STEERING CONTROL PROCESSING
S21
fb=1 ?
No
Yes
S28
fa=1 ?
No
Yes
S22
CALCULATE CORRECTED REACTIVE PERCEPTION QUANTITY (k1 × Fb)
S29
CALCULATE CORRECTED REACTIVE PERCEPTION QUANTITY (k6 × Fa)
S23
CORRECT L SUCH THAT Rs MATCHES (k1 × Fb)
S30
CORRECT L SUCH THAT Rs MATCHES (k6 × Fa)
S24
SET TARGET STEERING REACTIVE PERCEPTION QUANTITY Fs AND TARGET ROTATION ANGULAR VELOCITY PERCEPTION QUANTITY Gs ON BASIS OF L OR LA
S25
DRIVE REACTION MOTOR
S26
EXECUTE STEERING
S27
fs←1
END

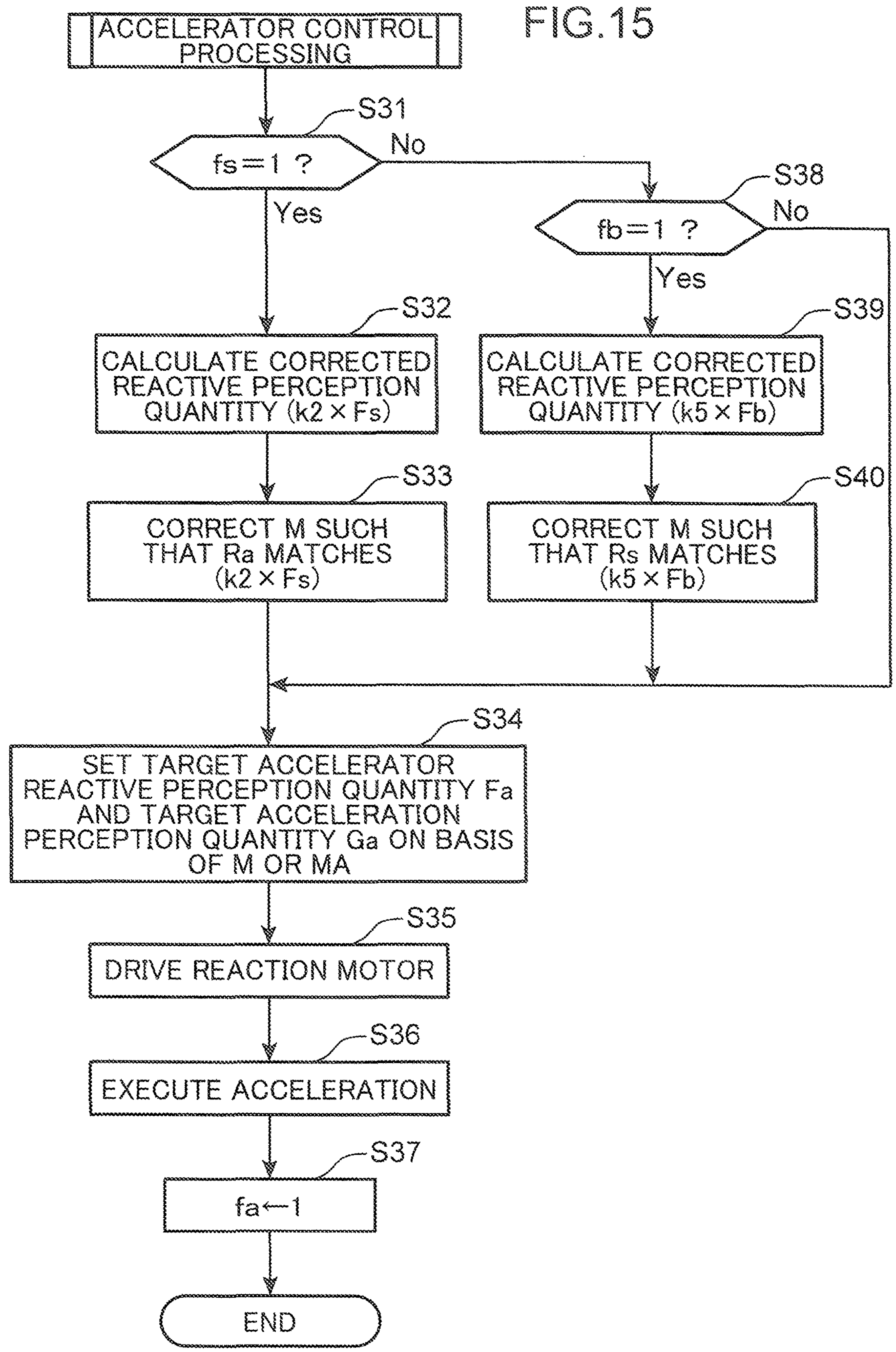
FIG.15
ACCELERATOR CONTROL PROCESSING
S31
fs=1 ?
No
Yes
S38
fb=1 ?
No
Yes
S32
CALCULATE CORRECTED REACTIVE PERCEPTION QUANTITY (k2×Fs)
S39
CALCULATE CORRECTED REACTIVE PERCEPTION QUANTITY (k5×Fb)
S33
CORRECT M SUCH THAT Ra MATCHES (k2×Fs)
S40
CORRECT M SUCH THAT Rs MATCHES (k5×Fb)
S34
SET TARGET ACCELERATOR REACTIVE PERCEPTION QUANTITY Fa AND TARGET ACCELERATION PERCEPTION QUANTITY Ga ON BASIS OF M OR MA
S35
DRIVE REACTION MOTOR
S36
EXECUTE ACCELERATION
S37
fa←1
END

VEHICLE CONTROL APPARATUS CAPABLE OF GIVING CONTINUITY TO REACTIVE PERCEPTION QUANTITIES OF COOPERATIVE OPERATION PERCEIVED BY OCCUPANT

TECHNICAL FIELD

The present invention relates to a vehicle control apparatus.

BACKGROUND ART

Conventional vehicle control involves setting a target operation quantity on the basis of operating characteristics (control map) and controlling the behavioral operation of a vehicle. The operating characteristics (control map) define a correlation between an operation quantity of operation devices (such as accelerator pedal) and an operation quantity (such as acceleration) of the vehicle when an occupant operates the operation devices.

In order to improve an operation feeling of an occupant, a large number of control apparatuses configured to perform vehicle control suited for sensibility of the occupant on the basis of psychophysics have been proposed.

Fechner's law and Stevens' law are known as laws that express the relation between physical quantity and sensory quantity (perception quantity) in the form of functions. Fechner's law states that the sensory quantity is proportional to the logarithm of stimulus intensity, and Stevens' law states that the sensory quantity is proportional to the power of stimulus intensity.

A vehicle control apparatus disclosed in Japanese Unexamined Patent Publication No. 2011-143915 includes an acceleration generation device configured to generate an acceleration to a vehicle and a control device configured to control the acceleration generation device on the basis of an accelerator opening degree corresponding to an accelerator pedal operation by an occupant and a vehicle speed. In the vehicle control apparatus, the relation between the accelerator opening degree and a request acceleration is changed on the basis of a minimum generation acceleration that can be generated by the acceleration generation device while maintaining predetermined characteristics.

A vehicle power steering apparatus disclosed in Japanese Unexamined Patent Publication No. 2015-214295 includes a steering angle sensor, a steering torque sensor, and a control unit configured to control assist power for an electric motor so as to achieve target steering force characteristics defined by a plurality of characteristic elements. In the vehicle power steering apparatus, the control device includes a sensory quantity setting unit configured to set a plurality of sensory quantities to be estimated to act on an occupant, and a steering force setting unit configured to set target steering force characteristics by converting the plurality of sensory quantities set by the sensory quantity setting unit into physical quantities of a plurality of characteristic elements.

In recent years, vehicles employing a by-wire system have been put into practical use. A vehicle employing a by-wire system includes operation devices to be operated by an occupant, an actuator (reaction motor) for applying an operation reaction force to the operation devices, and driving devices for driving the actuator such that the vehicle operates with a predetermined response quantity in response to an operation quantity of the operation devices.

In the vehicle employing the by-wire system, the operation devices and the driving devices are not mechanically coupled to each other, but an actual operation quantity of the operation devices by the occupant, a reaction quantity for the occupant, and a response quantity of the vehicle are configured as independent elements that are mechanically separated from one another.

In general, vehicle driving involves a transition of driving states in the order of environment recognition by an occupant, situation judgment by the occupant, device operation by the occupant, and response operation by the vehicle.

Recognition, judgement, and operation are elements that are mainly judged by a sensory region (within brain) of the occupant, and the response quantity in response to the behavior of the vehicle is an element that is mainly judged by a physical region (reality).

Specifically, there may be difference between a perception quantity (response perception quantity) which is perceived by the occupant through visual sensation and somatic sensation and a physical response quantity with which the vehicle actually operates, and there may be difference between a perception quantity (reactive perception quantity) which is perceived by the occupant through somatic sensation and a physical operation quantity (or reaction quantity in response to operation) of actual operation performed on the operation devices.

Therefore, in the situation where the occupant operates operation devices of the vehicle, it is necessary to appropriately apply a perception quantity that takes sensory characteristics of the occupant into consideration to the occupant on the basis of mechanical characteristics of human four limbs.

The vehicle control apparatus disclosed in Japanese Unexamined Patent Publication No. 2011-143915 generates, on the basis of Fechner's law, an acceleration feeling (acceleration perception quantity) adapted to sensitivity of an occupant with respect to an operation quantity of the accelerator pedal. The vehicle power steering apparatus disclosed in Japanese Unexamined Patent Publication No. 2015-214295 adjusts, on the basis of Fechner's law, a steering feeling (steering reactive perception quantity) by using an operation feeling of the steering wheel.

The technologies disclosed in Japanese Unexamined Patent Publication Nos. 2011-143915 and 2015-214295, however, have the following problems when a plurality of operation devices are continuously operated in a cooperative manner.

Vehicle driving involves many situations where a plurality of operation devices are continuously operated in a cooperative manner.

For example, vehicle turning travel involves a pedaling operation of a brake pedal and start of steering of a steering wheel during the pedaling operation of the brake pedal in the initial stage of turning and start of pedaling of an accelerator pedal during the steering operation of the steering wheel in the later stage of turning.

Specifically, in the initial stage of turning, that is, in the state in which a predetermined operation reaction force (pedaling force) in response to the pedaling operation of the brake pedal acts on the leg of the occupant, the occupant starts operating the steering wheel with a low operation reaction force (steering force). Accordingly, the occupant may feel uncomfortable due to the difference in operation force, resulting in increased driving load.

In the later stage of turning, that is, in the state in which a predetermined operation reaction force (steering force) in response to the steering operation of the steering wheel acts on the arm of the occupant, the occupant starts operating the accelerator pedal with a low operation reaction force (pedaling force). Accordingly, the occupant may feel uncomfortable due to the difference in operation force, resulting in increased driving load.

In other words, in the technologies disclosed in Japanese Unexamined Patent Publication Nos. 2011-143915 and 2015-214295, the reactive perception quantity for single operation devices or the response perception quantity of the vehicle are adapted to the sensibility of the occupant, but the occupant cannot feel a fully comfortable operation feeling when the occupant continuously operates a plurality of operation devices in a cooperative manner.

SUMMARY OF INVENTION

It is an object of the present invention to provide a vehicle control apparatus capable of improving operability in a continuous cooperative operation of a plurality of operation devices.

A vehicle control apparatus according to one aspect of the present invention includes: a plurality of operation devices; a plurality of reaction applying devices; a plurality of driving devices; and a control device. The plurality of operation devices receive operations from an occupant. The plurality of reaction applying devices apply reaction forces to the occupant in accordance with respective operation quantities of the plurality of operation devices. The plurality of driving devices generate response quantities of a vehicle in accordance with the respective operation quantities of the plurality of operation devices. The control device controls the plurality of reaction applying devices and the plurality of driving devices.

In this aspect, when the occupant operates preceding operation devices and subsequently operates subsequent operation devices different from the preceding operation devices, the control device causes a reactive perception quantity that is perceived by the occupant when the occupant starts operating the subsequent operation devices to substantially match a reactive perception quantity that is perceived by the occupant when the occupant finishes operating the preceding operation devices.

The vehicle control apparatus according to the above aspect can give the continuity to reactive perception quantities perceived by an occupant, thereby improving operability in a continuous cooperative operation of a plurality of operation devices.

BRIEF DESCRIPTION OF DRAWINGS

FIG. 13 is a flowchart illustrating a brake control processing procedure;

FIG. 14 is a flowchart illustrating a steering control processing procedure; and FIG. 15 is a flowchart illustrating an accelerator control processing procedure.

DESCRIPTION OF EMBODIMENTS

Embodiments

Referring to FIGS. 1 to 15, a control apparatus 1 for a vehicle V according to embodiments is described below.

The embodiments described below exemplify a control apparatus 1 applied to a vehicle V including a steer-by-wire mechanism S, an accelerator-by-wire mechanism A, and a brake-by-wire mechanism B, and are not intended to limit the present invention, its applications, or its purposes.

Figure 1:
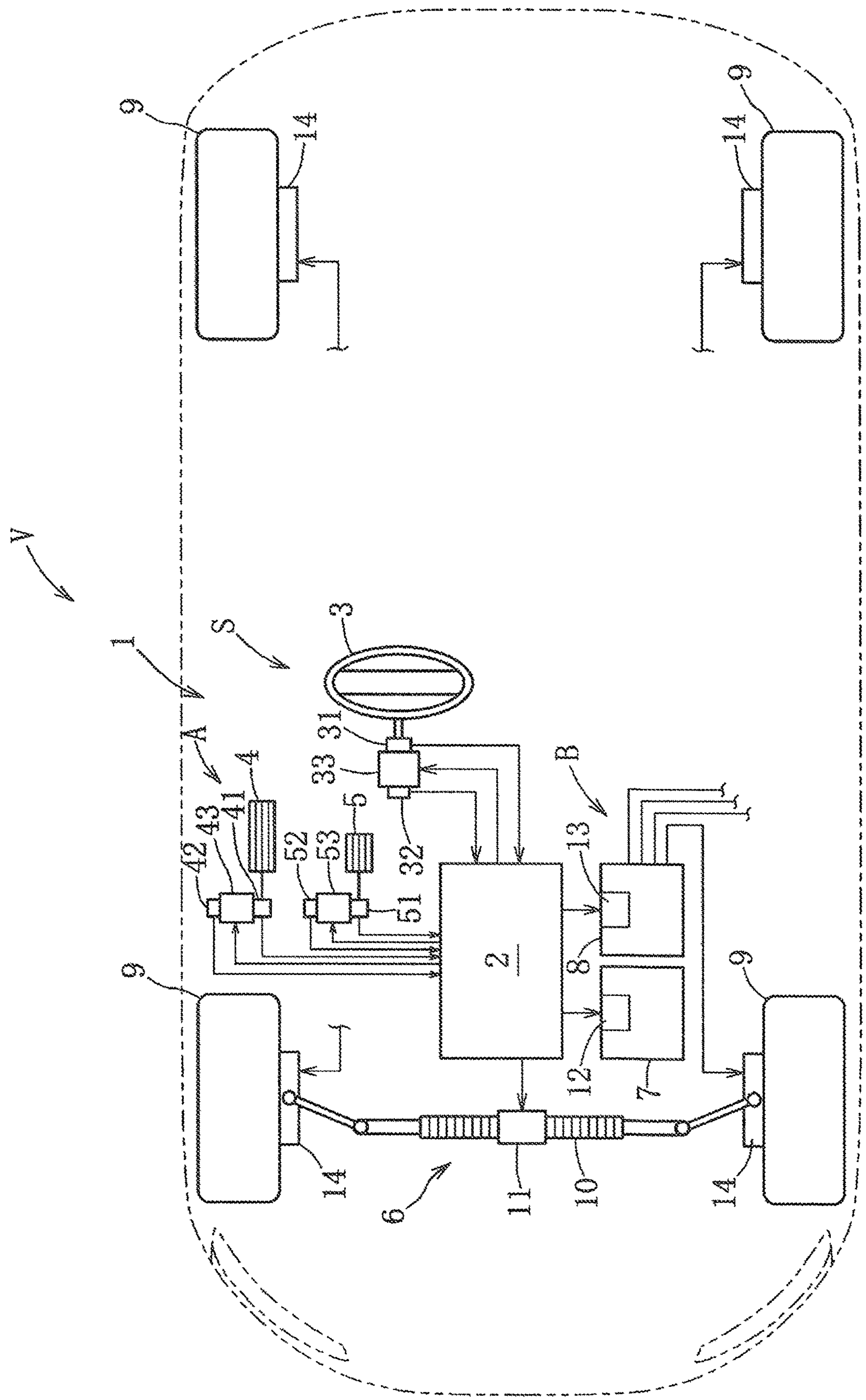
FIG. 1 is an overall schematic view illustrating a configuration of a control apparatus 1 for a vehicle V according to embodiments.

As illustrated in FIG. 1, a control apparatus 1 for a vehicle V includes a steer-by-wire mechanism S, an accelerator-by-wire mechanism A, a brake-by-wire mechanism B, an electronic control unit (ECU) 2, and other devices.

In the control apparatus 1 for the vehicle V, the ECU 2 is provided as control device.

The vehicle V includes a steering wheel (hereinafter abbreviated as "steering") 3 as arm system operation devices, and an accelerator pedal (hereinafter abbreviated as "accelerator") 4 and a brake pedal (hereinafter abbreviated as "brake") 5 as leg system operation devices. The vehicle V further includes a steering device 6, an engine 7, a brake device 8, and two pairs of front and rear wheels 9.

First, the steer-by-wire mechanism S is described.

Figure 2:
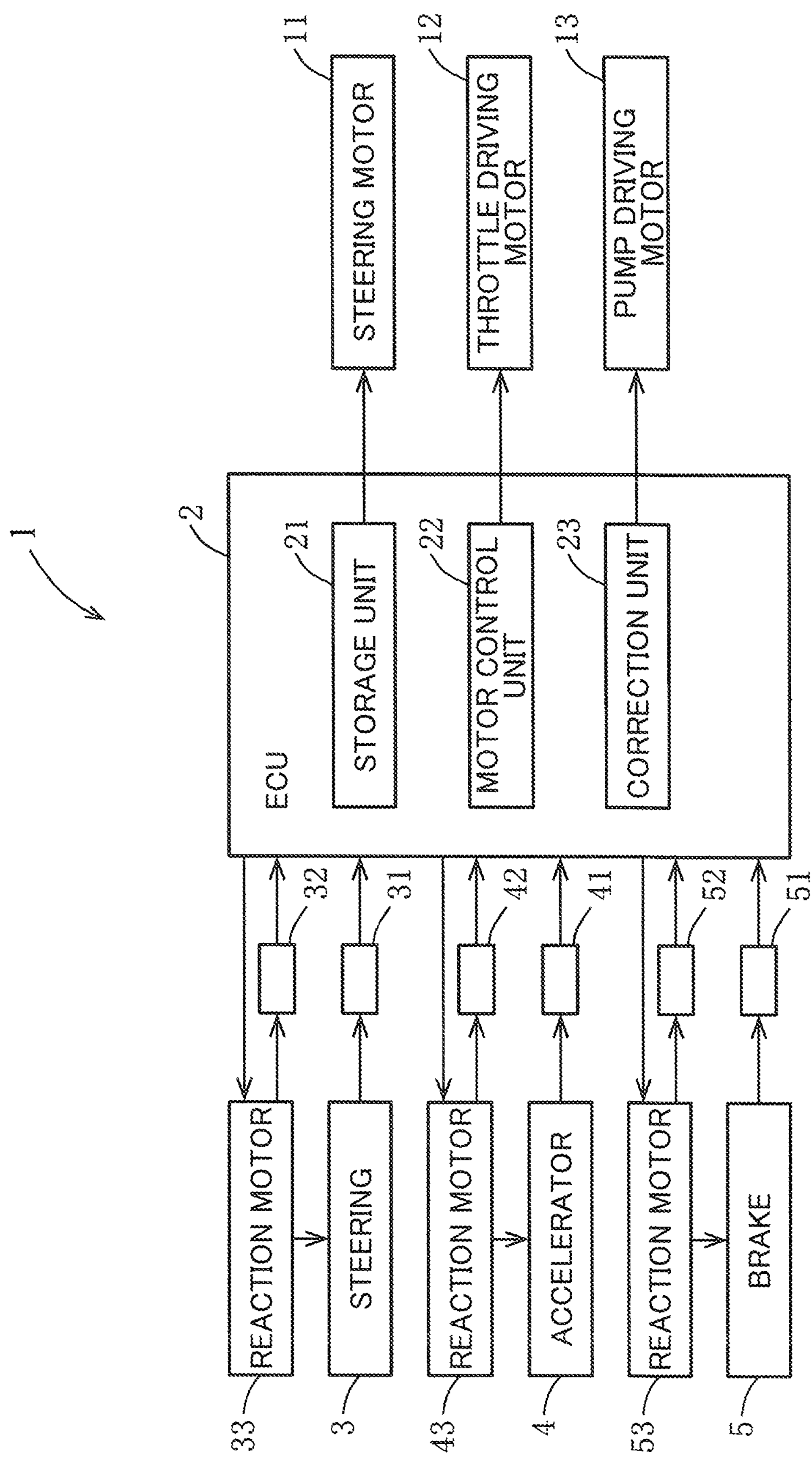
FIG. 2 is a block diagram illustrating a configuration of the control apparatus 1.

As illustrated in FIGS. 1 and 2, the steer-by-wire mechanism S is configured by mechanically separating the steering 3 and the steering device 6 that serves as turning driving devices for a pair of right and left front wheels 9.

The steer-by-wire mechanism S includes the steering 3, an operation quantity sensor 31 configured to detect an operation quantity (steering angle) Vs of the steering 3 by an occupant, an operation force sensor 32 configured to detect an operation force (steering torque) corresponding to the operation quantity Vs of the steering 3, and a reaction motor 33 configured to apply a reaction quantity Fsa, which is a physical operation reaction force, to the steering 3 on the basis of the operation quantity Vs of the steering 3. In the steer-by-wire mechanism S, the reaction motor 33 is provided as reaction applying devices.

The steering device 6 includes a steering rod 10 with a rack, which is coupled to each of the pair of right and left front wheels 9 via link mechanisms, and a steering motor 11 having a pinion gear capable of driving the steering rod 10 in the horizontal direction. The steering device 6 is configured such that the steering rod 10 driven by the steering motor 11 steers the pair of right and left front wheels 9 to control a rotation angular velocity Gsa, which is a physical response quantity of the vehicle V.

In the steering device 6, the steering motor 11 is provided as driving devices.

The steering motor 11, the operation quantity sensor 31, the operation force sensor 32, and the reaction motor 33 are each electrically connected to the ECU 2.

Next, the accelerator-by-wire mechanism A is described.

As illustrated in FIGS. 1 and 2, the accelerator-by-wire mechanism A is configured by mechanically separating the accelerator 4 formed of an organ style pedal support mechanism and a throttle valve (not shown) of the engine 7.

The accelerator-by-wire mechanism A includes the accelerator 4, an operation quantity sensor 41 configured to detect an operation quantity (pedaling amount) Va of the accelerator 4 by the occupant, an operation force sensor 42 configured to detect an operation force (pedaling force) corresponding to the operation quantity Va of the accelerator 4, and a reaction motor 43 configured to apply a reaction quantity Faa, which is a physical operation reaction force, to the accelerator 4 on the basis of the operation quantity Va of the accelerator 4.

In the accelerator-by-wire mechanism A, the reaction motor 43 is provided as reaction applying devices.

The engine 7 includes a throttle driving motor 12 capable of rotationally driving the throttle valve. Through adjustment of an opening degree of the throttle valve driven by the throttle driving motor 12, the engine 7 controls an acceleration Gaa, which is a physical response quantity of the vehicle V.

In the engine 7, the throttle driving motor 12 is provided as driving devices.

The throttle driving motor 12, the operation quantity sensor 41, the operation force sensor 42, and the reaction motor 43 are each electrically connected to the ECU 2.

Next, the brake-by-wire mechanism B is described.

As illustrated in FIGS. 1 and 2, the brake-by-wire mechanism B is configured by mechanically separating the brake 5 formed of a suspended pedal support mechanism and a hydraulic brake mechanism 14 capable of braking the wheel 9.

The brake-by-wire mechanism B includes the brake 5, an operation quantity sensor 51 configured to detect an operation quantity (pedaling amount) Vb of the brake 5 by the occupant, an operation force sensor 52 configured to detect an operation force (pedaling force) corresponding to the operation quantity Vb of the brake 5, and a reaction motor 53 configured to apply a reaction quantity Fba, which is a physical operation reaction force, to the brake 5 on the basis of the operation quantity Vb of the brake 5.

In the brake-by-wire mechanism B, the reaction motor 53 is provided as reaction applying devices.

The hydraulic brake mechanism 14 includes a rotor disc provided to the wheel 9 so as to be rotatable integrally with the wheel 9, and a caliper capable of applying a braking force to the rotor disc (both not shown).

The brake device 8 includes a hydraulic pump that uses a pump driving motor 13 as a driving source, a pressurization valve, and a return valve. In the brake device 8, the hydraulic pump is connected to a cylinder provided to the caliper (all not shown). When a brake hydraulic pressure is supplied from the hydraulic pump to the cylinder, a piston presses a brake pad toward the rotor disc, thereby controlling a deceleration Gba, which is a physical response quantity of the vehicle V.

In the brake device 8, the pump driving motor 13 is provided as driving devices.

The pump driving motor 13, the operation quantity sensor 51, the operation force sensor 52, and the reaction motor 53 are each electrically connected to the ECU 2.

Next, the ECU 2 is described.

The ECU 2 includes a central processing unit (CPU), a ROM, a RAM, an IN-side interface, and an OUT-side interface.

In the ROM, various kinds of programs and data for implementing cooperative control are stored. The RAM is provided with a processing area used for the CPU to perform a series of processing.

When the occupant operates at least one operation devices among the steering 3, the accelerator 4, and the brake 5 with a predetermined operation quantity Vs, Va, or Vb, the ECU 2 transmits an instruction signal for generating a reaction quantity Fsa, Faa, or Fba to the corresponding reaction motor 33, 43, or 53.

When any one of the operation devices is operated, the ECU 2 transmits an instruction signal for generating a response quantity Gsa, Gaa, or Gba of the vehicle V to the corresponding motor 11, 12, or 13 on the basis of basic perception characteristics L, M, and N (see FIGS. 3 to 5) made up of a reactive perception quantity (steering reactive perception quantity Fs, accelerator reactive perception quantity Fa, brake reactive perception quantity Fb) and a response perception quantity (rotation angular velocity perception quantity Gs, acceleration perception quantity Ga, deceleration perception quantity Gb) that are perceived by the occupant as a sense.

Figure 3:
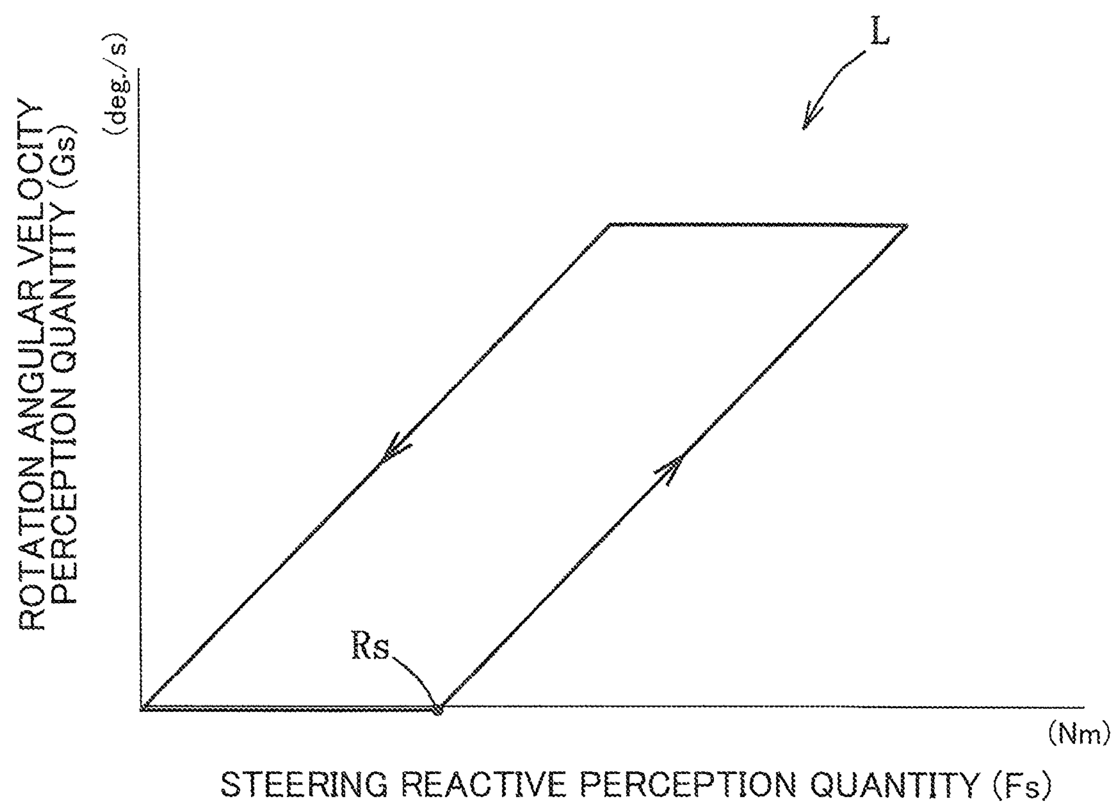
FIG. 3 is a characteristic diagram illustrating basic perception characteristics of a steer-by-wire mechanism S.
Figure 4:
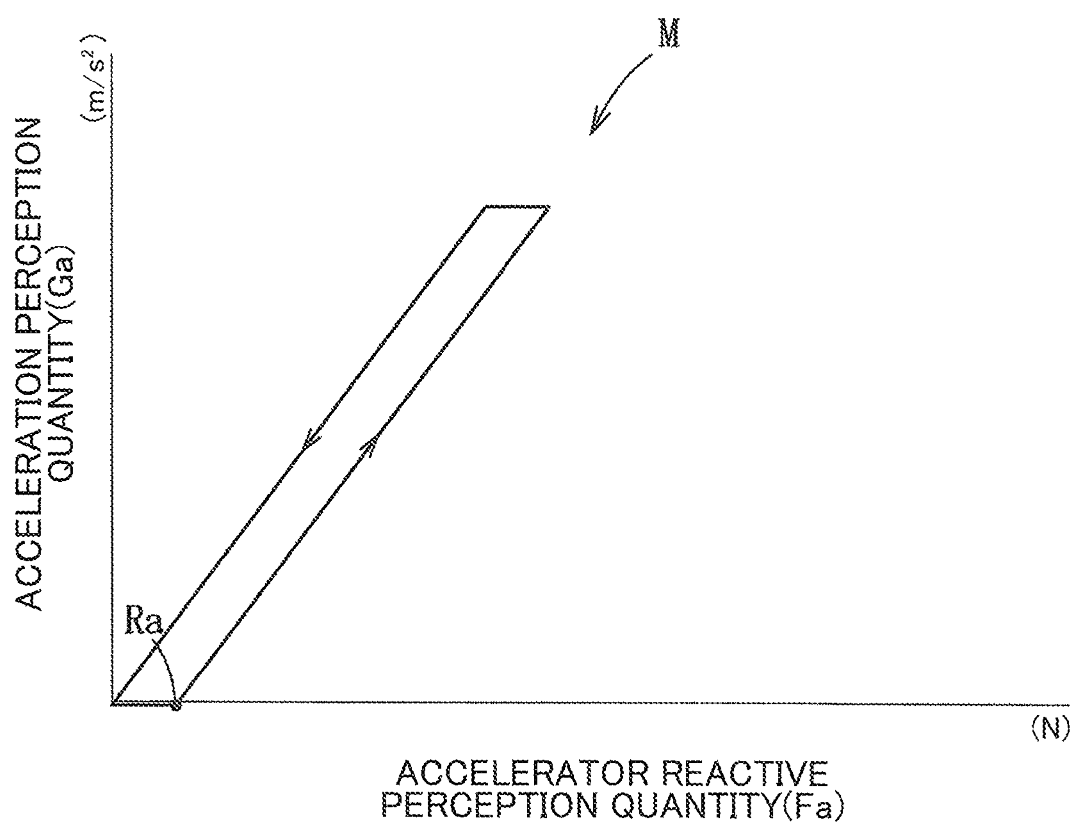
FIG. 4 is a characteristic diagram illustrating basic perception characteristics of an accelerator-by-wire mechanism A.
Figure 5:
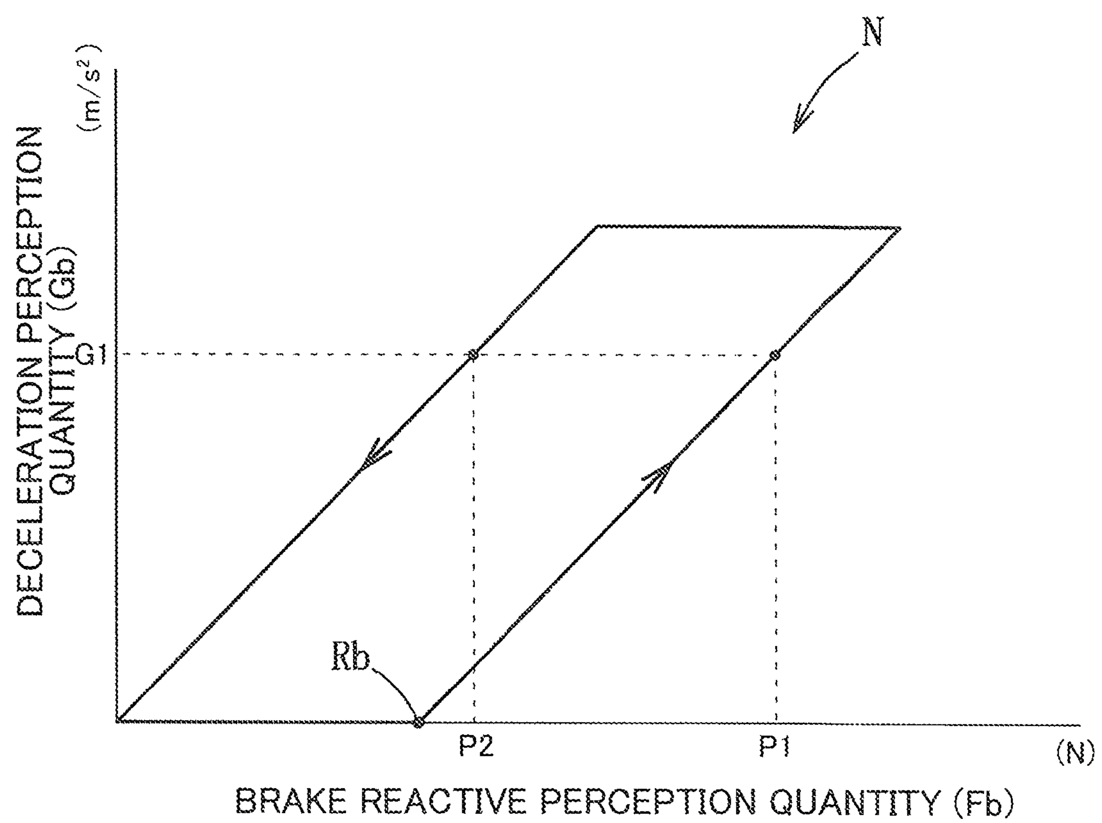
FIG. 5 is a characteristic diagram illustrating basic perception characteristics of a brake-by-wire mechanism B.

As illustrated in FIGS. 3 to 5, the ECU 2 stores therein the basic perception characteristics L, M, and N for the steer-by-wire mechanism S, the accelerator-by-wire mechanism A, and the brake-by-wire mechanism B, respectively.

The concept of the basic perception characteristics L, M, and N in the present embodiment is now described.

The basic perception characteristics L, M, and N are set such that the response perception quantities Gs, Ga, and Gb are linear with respect to the reactive perception quantities Fs, Fa, and Fb in order to achieve comfortable vehicle controllability.

The linearity is a correspondence relation in which a linear tendency is established partially or entirely.

This setting can secure the consistency between an increase/decrease tendency of the reactive perception quantities Fs, Fa, and Fb and an increase/decrease tendency of the response perception quantities Gs, Ga, and Gb (for example, when the reactive perception quantity is increased twice, the response perception quantity is also increased twice), thereby securing the linearity of vehicle controllability during the operation of the single operation devices 3, 4, or 5. The same concept is basically applied to these basic perception characteristics L, M, and N, and the basic perception characteristics L are described below as a representative example.

Figure 6:
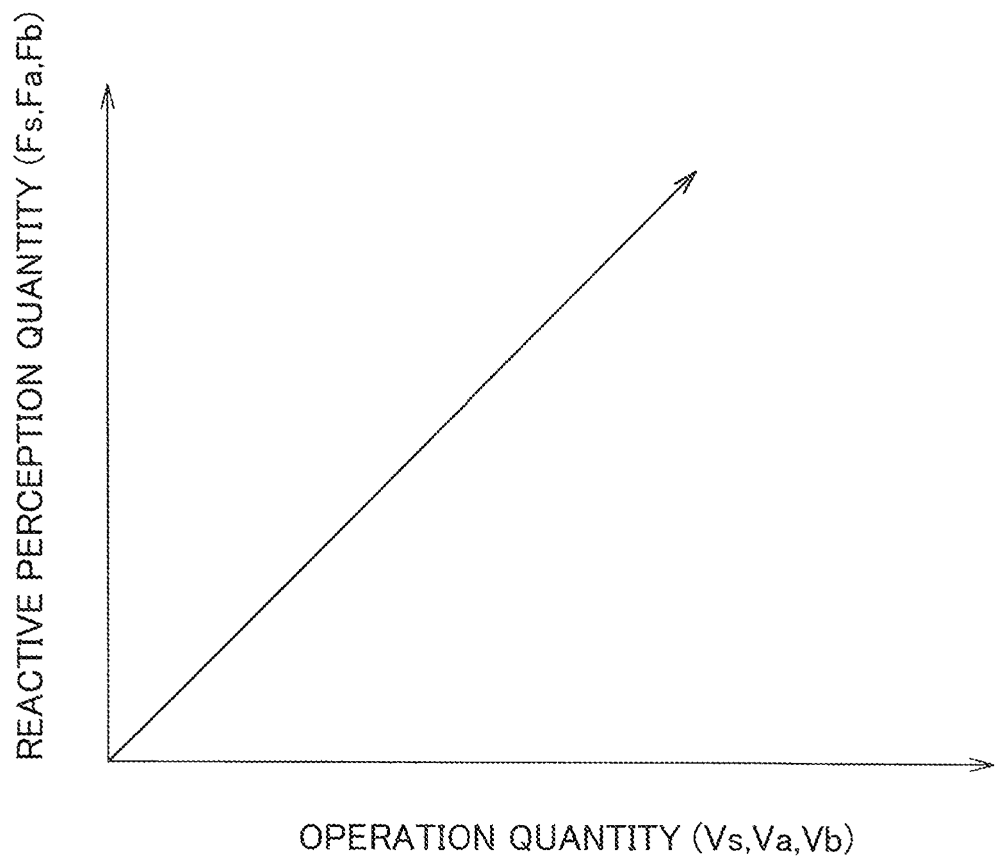
FIG. 6 is a schematic diagram for describing characteristics of an operation quantity and a reactive perception quantity.

As illustrated in FIG. 6, the operation quantity Vs of the steering 3 and the steering reactive perception quantity Fs that is perceived by the occupant when the occupant operates the steering 3 are set in advance so as to linearly correspond to each other. This relation improves the operability of the steering 3 by the occupant.

The steering reactive perception quantity Fs that is perceived by the occupant and a steering reaction quantity Fsa that is actually generated have different increase/decrease tendencies. In other words, the sensation intensity is proportional to the logarithm of the stimulus intensity (Fechner's law). Accordingly, the steering reaction quantity Fsa can be determined from the steering reactive perception quantity Fs by Expression (1):

$$Fs=k\log(Fsa)+K \quad (1)$$

where K is an integral constant.

Figure 7:
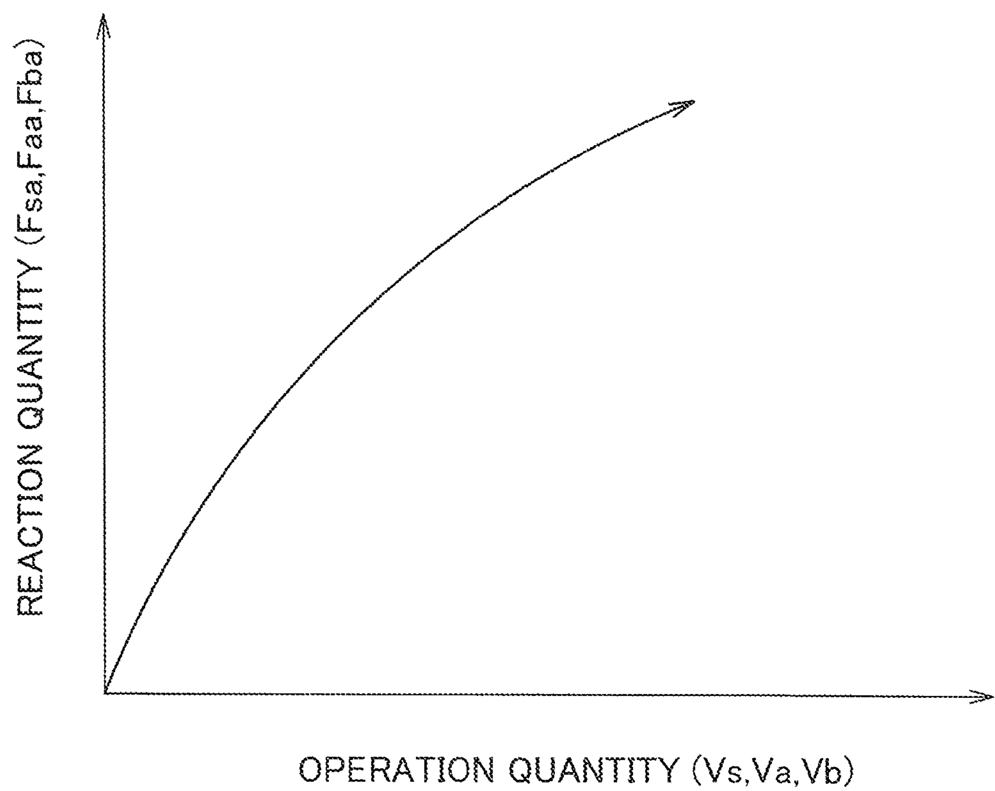
FIG. 7 is a schematic diagram for describing characteristics of an operation quantity and a reaction quantity.

In view of the above, as illustrated in FIG. 7, the operation quantity Vs of the steering 3 and the logarithmic steering reaction quantity Fsa that is actually received by the occupant when the occupant operates the steering 3 are set.

Figure 8:
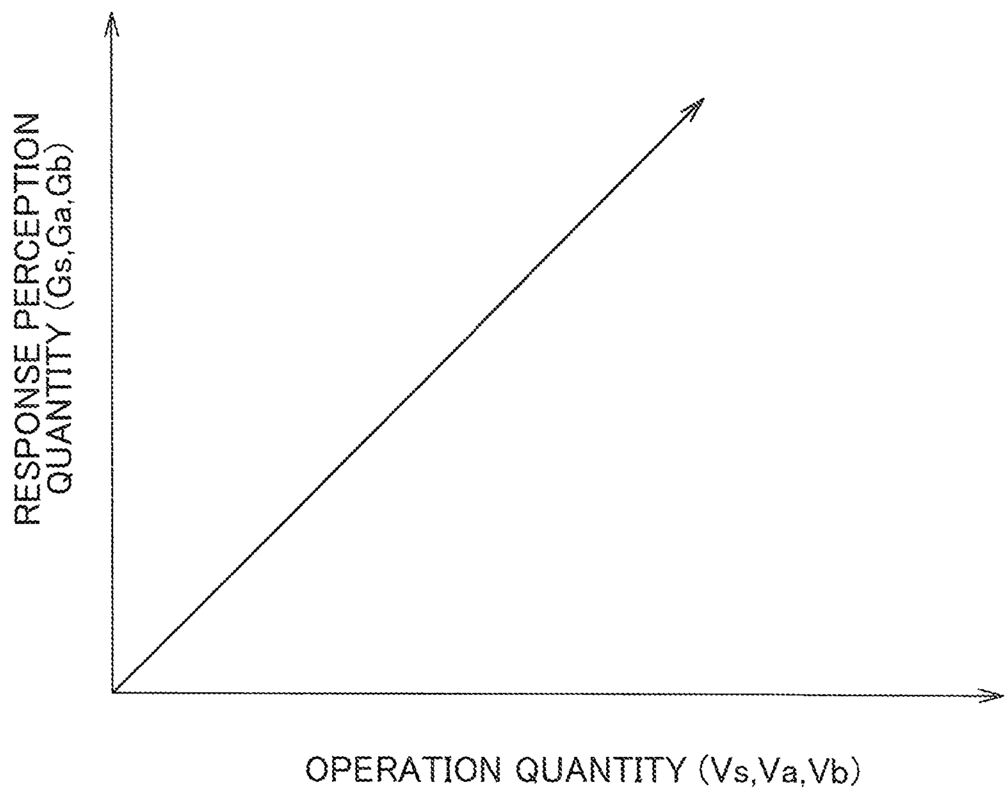
FIG. 8 is a schematic diagram for describing characteristics of an operation quantity and a response perception quantity.

As illustrated in FIG. 8, the operation quantity Vs of the steering 3 and the response quantity of the vehicle V that is perceived by the occupant when the occupant operates the steering 3, that is, the rotation angular velocity perception quantity Gs, are set in advance so as to linearly correspond to each other. The increase/decrease tendency of the rotation angular velocity perception quantity Gs of the vehicle V is set to be substantially the same as the increase/decrease tendency of the steering reactive perception quantity Fs.

This relation improves the controllability of the vehicle V by the occupant.

The rotation angular velocity perception quantity Gs that is perceived by the occupant and the rotation angular velocity Gsa of the vehicle V that is actually generated have different increase/decrease tendencies. Accordingly, the rotation angular velocity Gsa, which is an actual response quantity, can be determined from the rotation angular velocity perception quantity Gs by Expression (1).

Figure 9:
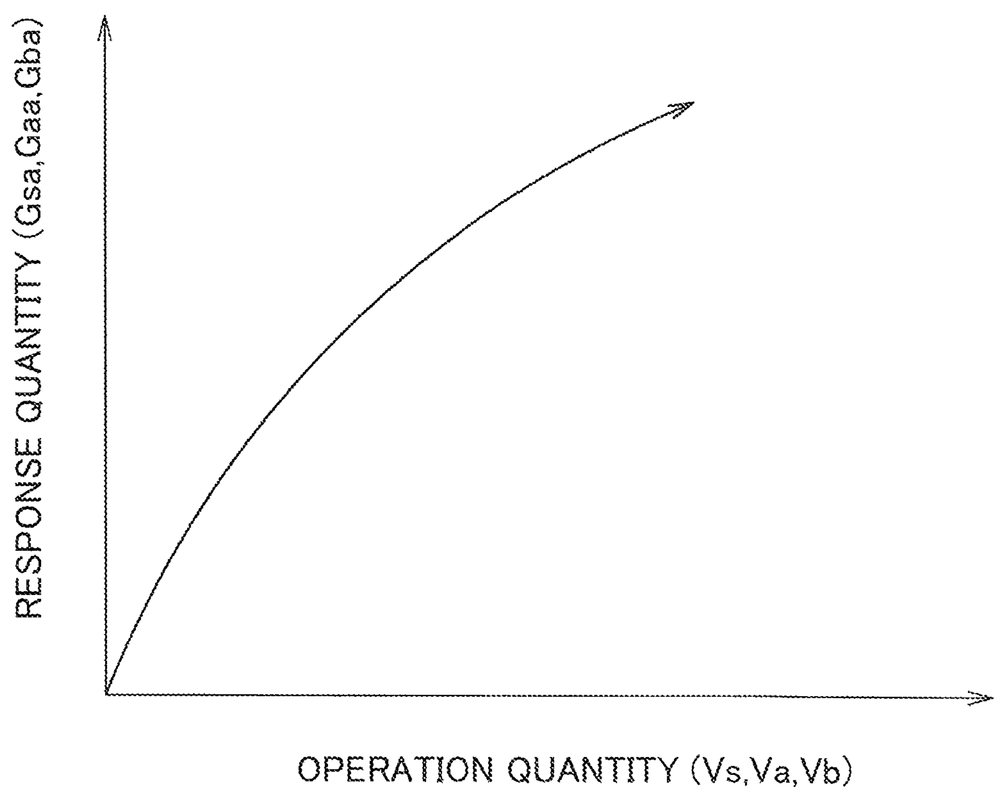
FIG. 9 is a schematic diagram for describing characteristics of an operation quantity and a response quantity.

In view of the above, as illustrated in FIG. 9, the operation quantity Vs of the steering 3 and the logarithmic rotation angular velocity Gsa that is actually responded by the vehicle V when the occupant operates the steering 3 are set.

The basic perception characteristics L are set to a linear correlation between the steering reactive perception quantity Fs that is perceived by the occupant through intermediation of the operation quantity Vs of the steering 3 and the rotation angular velocity perception quantity Gs.

Specifically, as illustrated in FIG. 3, the basic perception characteristics L are set such that when the steering 3 is steered, the rotation angular velocity perception quantity Gs is not generated until the steering reactive perception quantity Fs reaches a response start point Rs in an outbound path (turning steering). In a region where the steering reactive perception quantity Fs exceeds the response start point Rs, the basic perception characteristics L have a linear tendency that the rotation angular velocity perception quantity Gs becomes larger as the steering reactive perception quantity Fs becomes larger.

In a return path (turning-back steering), the basic perception characteristics L have a linear tendency that the rotation angular velocity perception quantity Gs becomes smaller to be “0” as the steering reactive perception quantity Fs becomes smaller.

As illustrated in FIG. 4, the basic perception characteristics M are set such that when the accelerator 4 is operated, the acceleration perception quantity Ga is not generated until the accelerator reactive perception quantity Fa reaches a response start point Ra in an outbound path (pedaling). In a region where the accelerator reactive perception quantity Fa exceeds the response start point Ra, the basic perception characteristics M have a linear tendency that the acceleration perception quantity Ga becomes larger as the accelerator reactive perception quantity Fa becomes larger.

In a return path (pedal releasing), the basic perception characteristics M have a linear tendency that the acceleration perception quantity Ga becomes smaller to be “0” as the accelerator reactive perception quantity Fa becomes smaller.

As illustrated in FIG. 5, the basic perception characteristics N are set such that when the brake 5 is operated, the deceleration perception quantity Gb is not generated until the brake reactive perception quantity Fb reaches a response start point Rb in an outbound path (pedaling). In a region where the brake reactive perception quantity Fb exceeds the response start point Rb, the basic perception characteristics N have a linear tendency that the deceleration perception quantity Gb becomes larger as the brake reactive perception quantity Fb becomes larger.

In a return path (pedal releasing), the basic perception characteristics N have a linear tendency that the deceleration perception quantity Gb becomes smaller to be “0” as the brake reactive perception quantity Fb for the occupant becomes smaller.

When the occupant operates second operation devices while executing the operation of the first operation devices, the ECU 2 controls a reactive perception quantity of the second operation devices that is perceived by the occupant when the occupant starts operating the second operation devices to substantially match a reactive perception quantity of the first operation devices that is perceived by the occupant when the occupant finishes operating the first operation devices.

The first operation devices refers to any one operation devices that is precedingly operated by the occupant among the operation devices 3 to 5, and the second operation devices refers to operation devices that is subsequently operated other than the first operation devices among the operation devices 3 to 5. The expression “substantially match” devices that one perception quantity including a force directed in one direction and a force (torque) directed in the rotational direction match the other perception quantity, and is defined as the state in which both perception quantities are regarded as being identical physically, sensuously, or perceptually.

As illustrated in FIG. 2, the ECU 2 outputs an instruction signal to each of the motors 11 to 13 and the reaction motors 33, 43, and 53, and inputs a detection signal from each of the operation quantity sensors 31, 41, and 51 and the operation force sensors 32, 42, and 52.

When the steering 3 is operated, the ECU 2 sets a flag fs to “1”, and executes steering control processing for controlling the reaction motor 33 and the steering motor 11.

Similarly, when the accelerator 4 is operated, the ECU 2 sets a flag fa to “1”, and executes accelerator control processing for controlling the reaction motor 43 and the throttle driving motor 12. When the brake 5 is operated, the ECU 2 sets a flag fb to “1”, and executes brake control processing for controlling the reaction motor 53 and the pump driving motor 13.

When none of the operation devices 3 to 5 is operated, the flags fs, fa, and fb are each set to “0”.

The ECU 2 includes a storage unit 21, a motor control unit 22, and a correction unit 23. The storage unit 21 stores therein, for example, the perception characteristics L, M, and N, correlation characteristics between the operation quantities Vs, Va, and Vb and the reaction quantities Fsa, Faa, and Fba, and correlation characteristics between the operation quantities Vs, Va, and Vb and the response quantities Gsa, Gaa, and Gba. The motor control unit 22 controls the reaction motors 33, 43, and 53 so as to achieve the respective reaction quantities Fsa, Faa, and Fba corresponding to the operation quantities Vs, Va, Vb by the occupant. The correction unit 23 corrects, on the basis of finish values of reactive perception quantities Fs, Fa, and Fb of first operation devices (preceding operation devices) 3 to 5 that have been precedingly operated, respective perception characteristics L, M, and N of second operation devices (subsequent operation devices) 3 to 5 that have been operated subsequently.

Next, the motor control unit 22 is described.

For driving control of the reaction motor 33, the motor control unit 22 controls a current I supplied to the reaction motor 33 such that the reaction motor 33 has a reaction quantity Fsa, which is a target reaction quantity set in advance, on the basis of the correlation characteristics between the operation quantity Vs and the reactive perception quantity Fs of the steering 3.

The motor control unit 22 inputs a detection value detected by the operation force sensor 32. After noise of the detection value is cut by a filter (not shown), the motor control unit 22 calculates a reference target current Io based on the detection value with a predetermined control gain. The motor control unit 22 determines a deviation between the detection value detected by the operation force sensor 32 and the target reaction quantity Fsa on the basis of the correlation characteristics between the operation quantity Vs of the steering 3 and the reaction quantity Fsa of the steering 3, calculates a compensation current If on the basis of the deviation and the control gain, and adds the reference target current Io and the compensation current If together to calculate a target current I supplied to the reaction motor 33. Driving control of the reaction motors 43 and 53 is performed in the same manner as described above.

Next, the correction unit 23 is described.

When the occupant operates second operation devices 3 to 5 while executing the preceding operation of first operation devices 3 to 5, the correction unit 23 corrects the basic perception characteristics L, M, and N to corrected perception characteristics LA, MA, and NA such that the reactive perception quantities Fs, Fa, and Fb of the second operation devices 3 to 5 at the response start points Rs, Ra, and Rb substantially match the values of reactive perception quantities Fs, Fa, and Fb at the time when the operation of the first operation devices 3 to 5 is finished at the start of the operation of the second operation devices 3 to 5.

The correction unit 23 is specifically described by taking turning travel of the vehicle V as an example.

For the sake of description, the reactive perception quantities Fs, Fa, and Fb and the response perception quantities Gs, Ga, and Gb to be perceived by the occupant are used for description.

In an initial stage of turning, the brake 5 is pressed, and the steering operation of the steering 3 is started during the pedaling operation of the brake 5. Thus, the first operation device corresponds to the brake 5, and the second operation device corresponds to the steering 3.

As illustrated in FIG. 5, when a brake reactive perception quantity P1 is generated upon completion of the pedaling operation of the brake 5, the vehicle V decelerates with a deceleration perception quantity G1.

When the occupant starts operating the steering 3 in this state, a brake reactive perception quantity P2 acts on the leg of the occupant, but the steering reactive perception quantity Fs at the response start point Rs at which the vehicle V starts the response operation is different from the brake reactive perception quantity P2. Thus, the control based on the basic perception characteristics L makes the occupant feel uncomfortable.

The brake 5 is leg system operation devices, and the steering 3 is arm system operation devices. Accordingly, the ECU 2 calculates a reactive perception quantity (k1×P2) received by the arm, which corresponds to the brake reactive perception quantity P2 received by the leg. k1 is a perception correction factor for converting a force sensation received by the leg with the suspended pedal support mechanism into a force sensation received by the arm.

Figure 10:
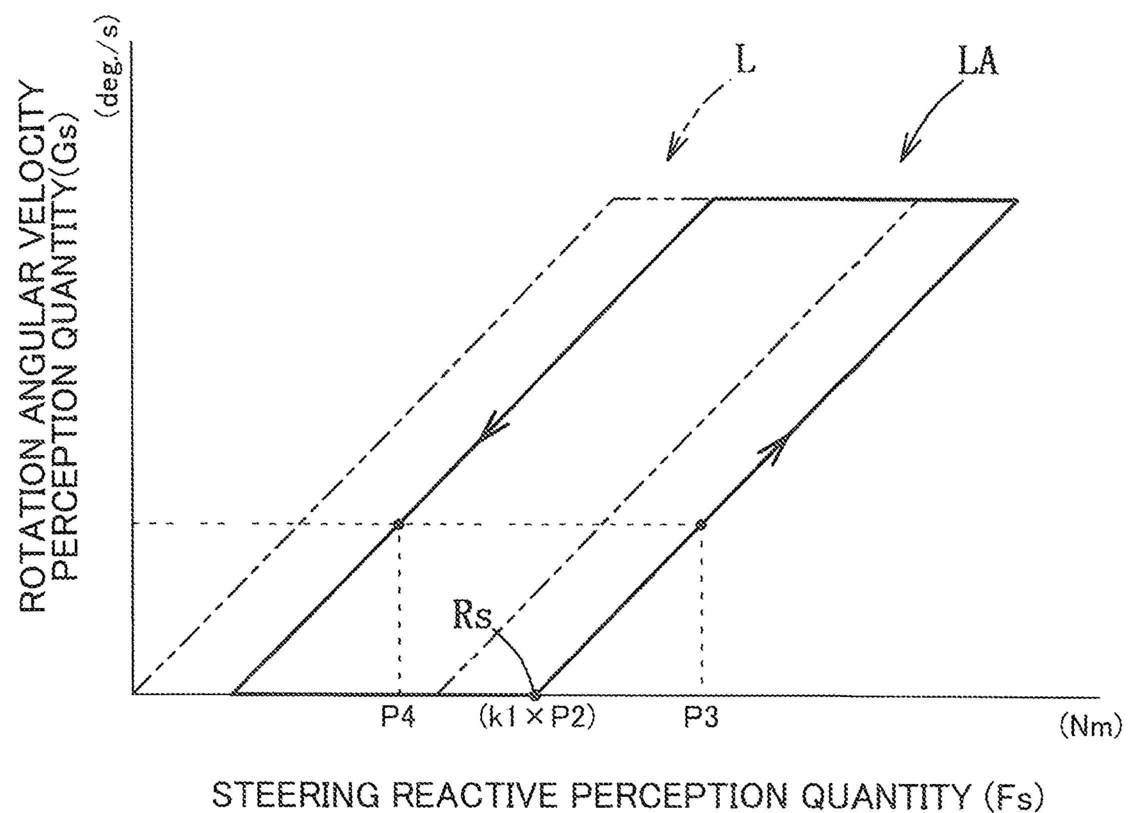
FIG. 10 is a characteristic diagram illustrating corrected perception characteristics of a steer-by-wire mechanism S.

As illustrated in FIG. 10, in order that the response operation of the vehicle V in response to the operation of the steering 3 starts from the corrected reactive perception quantity (k1×P2), the correction unit 23 corrects the basic perception characteristics L to the corrected perception characteristics LA obtained by translation such that the response start point Rs matches the corrected reactive perception quantity (k1×P2).

Consequently, the continuity can be given to the reactive perception quantities Fb and Fs perceived by the occupant in the cooperative operation.

In a later stage of turning, the steering 3 is steered, and the pedaling operation of the accelerator 4 is started during the steering operation of the steering 3. Thus, the first operation devices corresponds to the steering 3, and the second operation devices corresponds to the accelerator 4.

As illustrated in FIG. 10, when a steering reactive perception quantity P3 is generated upon completion of the steering operation of the steering 3, the vehicle V makes a turn with a rotation angular velocity perception quantity G2.

When the occupant starts operating the accelerator 4 in this state, a steering reactive perception quantity P4 acts on the arm of the occupant, but the accelerator reactive perception quantity Fa at the response start point Ra at which the vehicle V starts the response operation is different from the steering reactive perception quantity P4. Thus, the control based on the basic perception characteristics M makes the occupant feel uncomfortable.

The steering 3 is arm system operation devices, and the accelerator 4 is leg system operation devices. Accordingly, the ECU 2 calculates a reactive perception quantity (k2×P4) received by the leg of the occupant, which corresponds to the steering reactive perception quantity P4 received by the arm of the occupant. k2 is a perception correction factor for converting a force sensation received by the arm of the occupant into a force sensation received by the leg of the occupant with the organ style pedal support mechanism.

Figure 11:
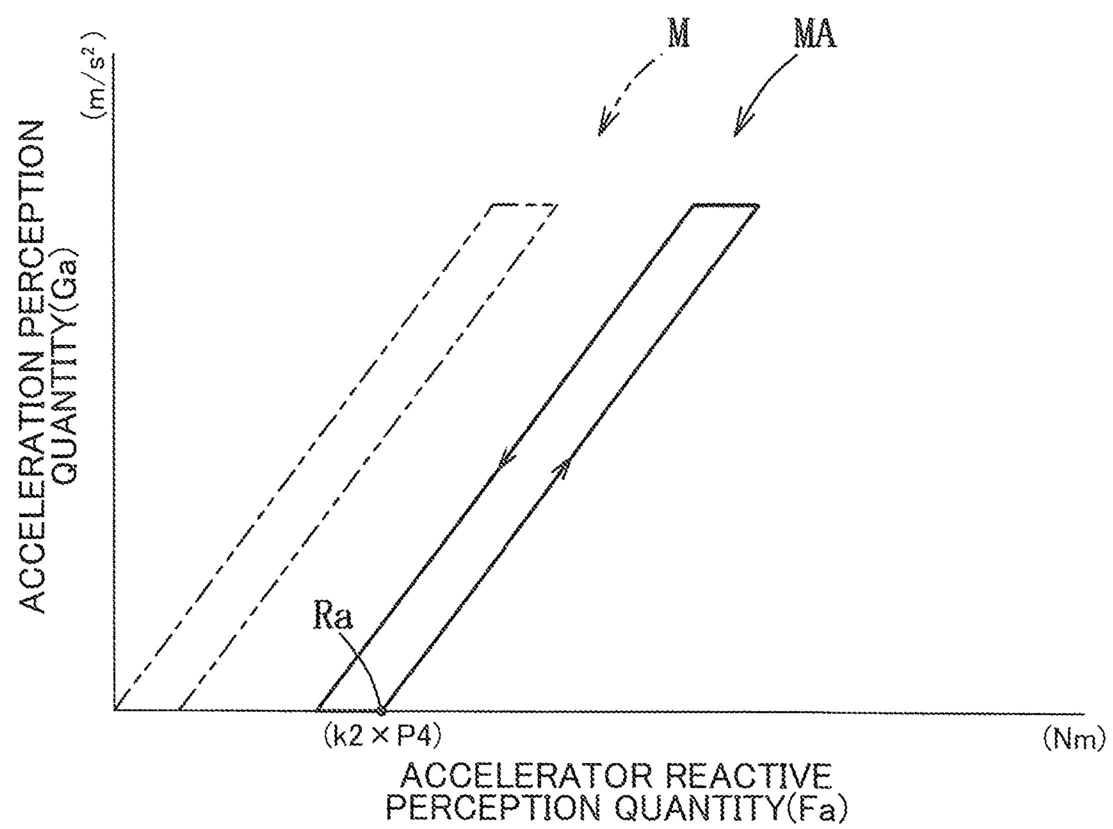
FIG. 11 is a characteristic diagram illustrating corrected perception characteristics of an accelerator-by-wire mechanism A.

As illustrated in FIG. 11, in order that the response operation of the vehicle V in response to the operation of the accelerator 4 starts from the corrected reactive perception quantity (k2×P4), the correction unit 23 corrects the basic perception characteristics M to the corrected perception characteristics MA obtained by translation such that the response start point Ra matches the corrected reactive perception quantity (k2×P4).

Consequently, the continuity can be given to the reactive perception quantities Fs and Fa perceived by the occupant in the cooperative operation.

Similarly, a perception correction factor k3 for converting a force sensation received by the leg of the occupant with the organ style pedal support mechanism into a force sensation received by the leg of the occupant with the suspended pedal support mechanism, a perception correction factor k4 for converting a force sensation received by the arm of the occupant into a force sensation received by the leg of the occupant with the suspended pedal support mechanism, a perception factor k5 for converting a force sensation received by the leg of the occupant with the suspended pedal support mechanism into a force sensation received by the leg of the occupant with the organ style pedal support mechanism, and a perception correction factor k6 for converting a force sensation received by the leg of the occupant with the organ style pedal support mechanism into a force sensation received by the arm are each set.

These perception correction factors k1 to k6 are each set on the basis of the weight, muscle strength, and sensory sensitivity of an operation part of the occupant, an installation position, support structure, and operation form of the mechanism to be operated, and other such parameters.

Referring to flowcharts in FIGS. 12 to 15, a cooperative control processing procedure executed by the ECU 2 as control device is next described. Si (i=1, 2 . . . ) indicates a step for each processing.

Figure 12:
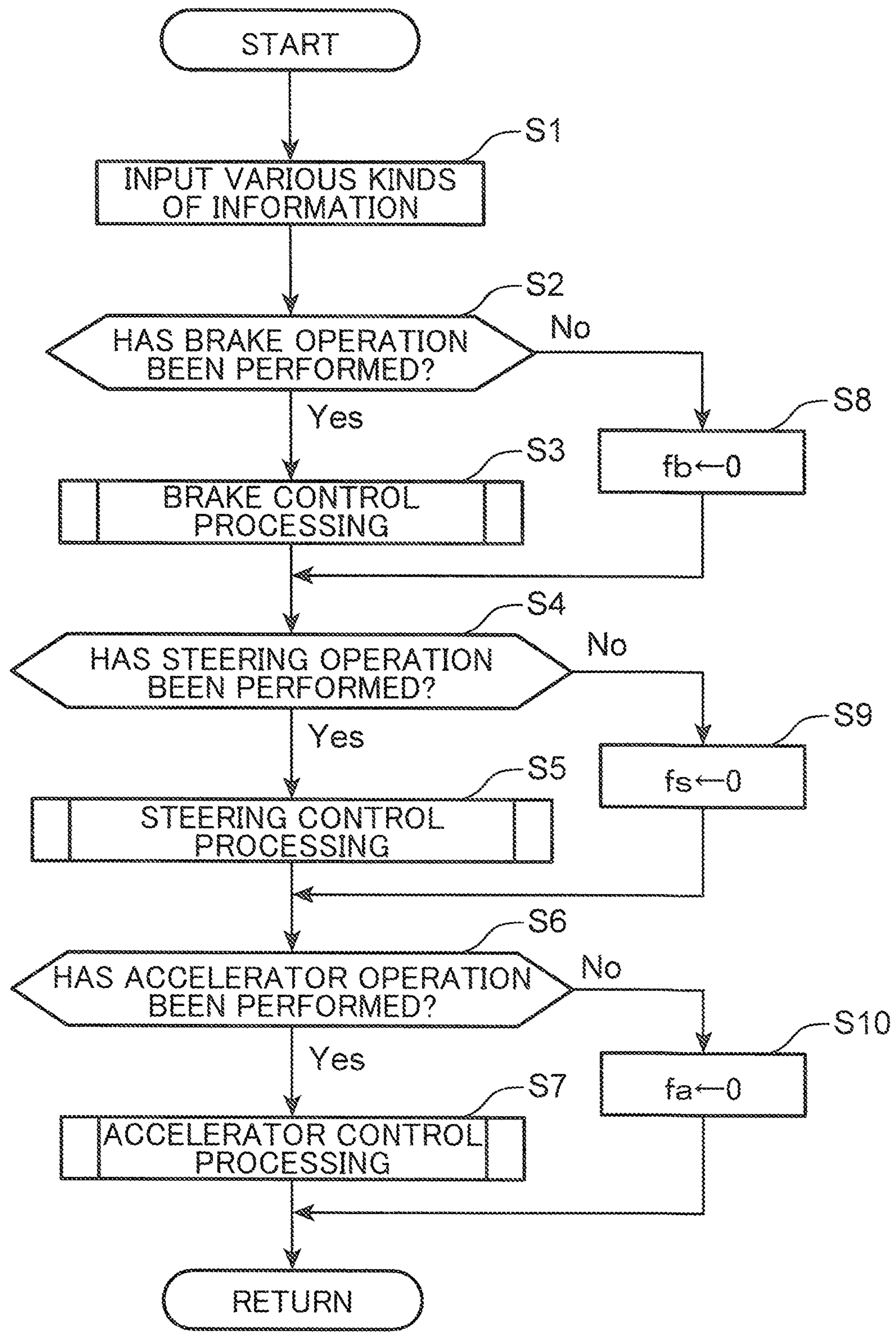
FIG. 12 is a flowchart illustrating a cooperative control processing procedure.

As illustrated in the flowchart in FIG. 12, in cooperative control processing, in Step S1, the ECU 2 first reads information such as detection value of each sensor and operating characteristics. The flow proceeds to Step S2.

In Step S2, the ECU 2 determines whether the occupant has operated the brake 5.

When the ECU 2 determines that the brake 5 has been operated as a result of the determination in Step S2, the flow proceeds to Step S3, and the ECU 2 executes brake control processing. When determining that the brake 5 has not been operated as a result of the determination in Step S2, the ECU 2 sets the flag fb to "0" (Step S8). The flow proceeds to Step S4.

In Step S4, the ECU 2 determines whether the occupant has operated the steering 3.

When the ECU 2 determines that the steering 3 has been operated as a result of the determination in Step S4, the flow proceeds to Step S5, and the ECU 2 executes steering control processing. When determining that the steering 3 has not been operated as a result of the determination in Step S4, the ECU 2 sets the flag fs to "0" (Step S9). The flow proceeds to Step S6.

In Step S6, the ECU 2 determines whether the occupant has operated the accelerator 4.

When the ECU 2 determines that the accelerator 4 has been operated as a result of the determination in Step S6, the flow proceeds to Step S7. The ECU 2 executes accelerator control processing, and the flow returns. When determining that the accelerator 4 has not been operated as a result of the determination in Step S6, the ECU 2 sets the flag fa to "0" (Step S10), and the flow returns.

Referring to the flowchart in FIG. 13, a brake control processing procedure executed by the ECU 2 as control device is next described.

First, in Step S11, the ECU 2 determines whether the flag fs is "1".

When determining that the flag fs is "1" as a result of the determination in Step S11, which indicates that the steering 3 has already been operated, the ECU 2 detects the steering reactive perception quantity Fs corresponding to the steering operation quantity Vs upon completion of the operation, and uses the perception correction factor k4 to calculate the corrected reactive perception quantity (k4×Fs) (Step S12). The flow proceeds to Step S13.

In Step S13, the ECU 2 translates the basic perception characteristics N such that the response start point Rb matches the corrected reactive perception quantity (k4×Fs) to set the corrected perception characteristics NA. The flow proceeds to Step S14.

In Step S14, the ECU 2 sets a target brake reactive perception quantity Fb on the basis of the occupant operation quantity Vb, and sets a target deceleration perception quantity Gb on the basis of the basic perception characteristics N (corrected perception characteristics NA when the correction has been performed). The flow proceeds to Step S15.

In Step S15, the ECU 2 drives the reaction motor 53 so as to achieve a reaction quantity Fba on the basis of the target brake reactive perception quantity Fb. The flow proceeds to Step S16.

In Step S16, the ECU 2 drives the pump driving motor 13 so as to achieve a response quantity Gba on the basis of the target deceleration perception quantity Gb, and sets the flag fb to "1" (Step S17). The flow ends.

When the ECU 2 determines that the flag fs is "0" as a result of the determination in Step S11, the flow proceeds to Step S18, and the ECU 2 determines whether the flag fa is "1".

When determining that the flag fa is "1" as a result of the determination in Step S18, which indicates that the accelerator 4 has already been operated, the ECU 2 detects the accelerator reactive perception quantity Fa corresponding to the accelerator operation quantity Va upon completion of the operation, and uses the perception correction factor k3 to calculate the corrected reactive perception quantity (k3×Fa) (Step S19). The flow proceeds to Step S20.

In Step S20, the ECU 2 translates the basic perception characteristics N such that the response start point Rb matches the corrected reactive perception quantity (k3×Fa) to set the corrected perception characteristics NA. The flow proceeds to Step S14.

When the ECU 2 determines that the flag fa is "0" as a result of the determination in Step S18, the flow proceeds to Step S14.

Referring to the flowchart in FIG. 14, a steering control processing procedure executed by the ECU 2 as control device is next described.

First, in Step S21, the ECU 2 determines whether the flag fb is "1".

When determining that the flag fb is "1" as a result of the determination in Step S21, which indicates that the brake 5 has already been operated, the ECU 2 detects the brake reactive perception quantity Fb corresponding to the brake operation quantity Vb upon completion of the operation, and uses the perception correction factor k1 to calculate the corrected reactive perception quantity (k1×Fb) (Step S22). The flow proceeds to Step S23.

In Step S23, the ECU 2 translates the basic perception characteristics L such that the response start point Rs matches the corrected reactive perception quantity (k1×Fb) to set the corrected perception characteristics LA. The flow proceeds to Step S24.

In Step S24, the ECU 2 sets a target steering reactive perception quantity Fs on the basis of the occupant operation quantity Vs, and sets a target rotation angular velocity perception quantity Gs on the basis of the basic perception characteristics L (corrected perception characteristics LA when the correction has been performed). The flow proceeds to Step S25.

In Step S25, the ECU 2 drives the reaction motor 33 so as to achieve a reaction quantity Fsa on the basis of the target steering reactive perception quantity Fs. The flow proceeds to Step S26.

In Step S26, the ECU 2 drives the steering motor 11 so as to achieve a response quantity Gsa on the basis of the target rotation angular velocity perception quantity Gs, and sets the flag fs to "1" (Step S27). Then, the flow ends.

When the ECU 2 determines that the flag fb is "0" as a result of the determination in Step S21, the flow proceeds to Step S28, and the ECU 2 determines whether the flag fa is "1".

When determining that the flag fa is "1" as a result of the determination in Step S28, which indicates that the accelerator 4 has already been operated, the ECU 2 detects the accelerator reactive perception quantity Fa corresponding to the accelerator operation quantity Va upon completion of the operation, and uses the perception correction factor k6 to calculate the corrected reactive perception quantity (k6×Fa) (Step S29). The flow proceeds to Step S30.

In Step S30, the ECU 2 translates the basic perception characteristics L such that the response start point Rs matches the corrected reactive perception quantity (k6×Fa) to set the corrected perception characteristics LA. The flow proceeds to Step S24.

When the ECU 2 determines that the flag fa is "0" as a result of the determination in Step S28, the flow proceeds to Step S24.

Referring to the flowchart in FIG. 15, an accelerator control processing procedure executed by the ECU 2 as control device is next described.

First, in Step S31, the ECU 2 determines whether the flag fs is "1".

When determining that the flag fs is "1" as a result of the determination in Step S31, which indicates that the steering 3 has already been operated, the ECU 2 detects the steering reactive perception quantity Fs corresponding to the steering operation quantity Vs upon completion of the operation, and uses the perception correction factor k2 to calculate the corrected reactive perception quantity (k2×Fs) (Step S32). The flow proceeds to Step S33.

In Step S33, the ECU 2 translates the basic perception characteristics M such that the response start point Ra matches the corrected reactive perception quantity (k2×Fs) to set the corrected perception characteristics MA. The flow proceeds to Step S34.

In Step S34, the ECU 2 sets a target accelerator reactive perception quantity Fa on the basis of the occupant operation quantity Va, and sets a target acceleration perception quantity Ga on the basis of the basic perception characteristics M (corrected perception characteristics MA when the correction has been performed). The flow proceeds to Step S35.

In Step S35, the ECU 2 drives the reaction motor 43 so as to achieve a reaction quantity Faa on the basis of the target accelerator reactive perception quantity Fa. The flow proceeds to Step S36.

In Step S36, the ECU 2 drives the throttle driving motor 12 so as to achieve a response quantity Gaa on the basis of the target acceleration perception quantity Ga, and sets the flag fa to "1" (Step S37). The flow ends.

When the ECU 2 determines that the flag fs is "0" as a result of the determination in Step S31, the flow proceeds to Step S38, and the ECU 2 determines whether the flag fb is "1".

When determining that the flag fb is "1" as a result of the determination in Step S38, which indicates that the brake 5 has already been operated, the ECU 2 detects the brake reactive perception quantity Fb corresponding to the brake operation quantity Vb upon completion of the operation, and uses the perception correction factor k5 to calculate the corrected reactive perception quantity (k5×Fb) (Step S39). The flow proceeds to Step S40.

In Step S40, the ECU 2 translates the basic perception characteristics M such that the response start point Ra matches the corrected reactive perception quantity (k5×Fb) to set the corrected perception characteristics MA. The flow proceeds to Step S34.

When the ECU 2 determines that the flag fb is "0" as a result of the determination in Step S38, the flow proceeds to Step S34.

Next, the operations and effects provided by the control apparatus 1 for the vehicle V according to the present embodiment are described.

In the control apparatus 1 for the vehicle V, the reactive perception quantities Fs, Fa, and Fb that are perceived by the occupant when the occupant starts operating the second operation devices 3 to 5, which are subsequently operated, are controlled to substantially match the reactive perception quantities Fs, Fa, and Fb that are perceived by the occupant when the occupant finishes operating the first operation devices, which are precedingly operated. Consequently, even when the occupant operates different operation devices 3 to 5, the continuity can be given to the reactive perception quantities Fs, Fa, and Fb perceived by the occupant, thereby eliminating an uncomfortable operation feeling of the occupant.

The ECU 2 controls the reaction motors 33, 43, and 53 such that the operation quantities Vs, Va, and Vb of the operation devices 3 to 5 and the reactive perception quantities Fs, Fa, and Fb that are perceived by the occupant when the occupant operates the operation devices 3 to 5 have linearity. Consequently, the present embodiment can secure the linearity between the operation quantities Vs, Va, and Vb and the reactive perception quantities Fs, Fa, and Fb perceived by the occupant, thereby further improving the operability of the operation devices 3 to 5.

The ECU 2 controls the operation devices 3 to 5 such that the operation quantities Vs, Va, and Vb of the operation devices 3 to 5 and the response perception quantities Gs, Ga, and Gb that are perceived by the occupant when the occupant operates the operation devices 3 to 5 have linearity. Consequently, the linearity between the operation quantities Vs, Va, and Vb and the response perception quantities Gs, Ga, and Gb perceived by the occupant can be secured, thereby further improving the controllability of the vehicle V.

The response perception quantities Gs, Ga, and Gb are set to be linear with respect to the reactive perception quantities Fs, Fa, and Fb. Consequently, the present embodiment can secure the linearity between the reactive perception quantities Fs, Fa, and Fb perceived by the occupant through somatic sensation and the response perception quantities Gs, Ga, and Gb perceived by the occupant through visual sensation and somatic sensation, thereby achieving comfortable vehicle controllability.

The plurality of operation devices include at least one of arm system operation devices capable of being operated with a hand/arm and leg system operation devices capable of being operated with a foot/leg. Consequently, the present embodiment can eliminate an uncomfortable feeling even in a cooperative operation of any one of the arm system operation devices and the leg system operation devices.

The arm system operation devices include the steering 3, and the leg system operation devices include the accelerator 4 and the brake 5. Consequently, the present embodiment can eliminate an uncomfortable operation feeing in a cooperative operation among basic operations including a traveling operation, a turning operation, and a braking operation.

Modifications

Next, modifications obtained by partially modifying the embodiment, which provide the same effects as described above, are described.

(1) While in the embodiment, an example in which the present invention is applied to three kinds of operation devices, including the brake and the accelerator as leg system operation devices and the steering as arm system operation devices, has been described, the present invention may be applied to two kinds of operation devices among these operation devices.

The arm system operation devices is applicable not only to the steering but also to a shift lever, a parking lever, and various kinds of operation switches including command switches of various kinds of operation devices. The leg system operation devices are applicable not only to the brake and the accelerator but also to a clutch pedal. Consequently, an uncomfortable operation feeling in various cooperative operations in addition to basic operations including a traveling operation, a turning operation, and a braking operation can be eliminated.

When operation devices are newly added, a perception factor corresponding to each operation devices is individually set.

(2) While in the embodiment, an example of a vehicle including by-wire mechanisms has been described, the present invention may be adapted to a vehicle in which each operation device is mechanically coupled to corresponding driving devices.

The present invention is adaptable not only to an automobile but also to any vehicle that is moveable with use of a driving mechanism.

(3) While in the embodiment, an example in which the range from the origin to a response start point is set to a fixed value in each perception characteristics has been described, the range from the origin to the response start point in the perception characteristics can be changed on the basis of the weight, muscle strength, and sensory sensitivity of an operation part of the occupant, an installation position, support structure, and operation form of the mechanism to be operated, and other such parameters, and can be freely set in accordance with specifications.

While in the embodiment, an example in which translation is performed such that the response start point in the perception characteristics in the subsequent operation matches the reactive perception quantity upon completion of the preceding operation has been described, the return path may be fixed and only the outbound path may be translated such that the response start point in the operating characteristics matches an operation force of preceding operation. Consequently, the operation feeling in the return path can be maintained.

(4) While in the embodiment, an example in which the relation between the reaction quantity and the reactive perception quantity and the relation between the response quantity and the response perception quantity are set by using Fechner's law has been described, these relations may be set by using Stevens' law and may be set with a conversion function based on a simulation or an experiment.

While in the embodiment, an example in which the relation between the reaction quantity and the reactive perception quantity and the relation between the response quantity and the response perception quantity are set in the entire operation range for the occupant has been described, the relation between the reaction quantity and the reactive perception quantity and the relation between the response quantity and the response perception quantity may be set only in a predetermined region excluding a region where the correspondence relation is low, that is, a dull region. Specifically, the linear relation between the reaction quantity and the reactive perception quantity and the linear relation between the response quantity and the response perception quantity can be set only in an intermediate region excluding a region where the operation quantity is low and a region where the operation quantity is high, thereby executing control with good adaptive accuracy.

(5) While in the embodiment, an example in which the perception factor is set in accordance with the operation part (arm, leg) of the occupant and the operation devices for the operation target has been described, the perception factor may be set more finely.

Specifically, the perception factor can be set in accordance with a vehicle traveling state (such as vehicle speed, driving time zone, and traveling environment), an occupant state (such as emotion, physical condition, number of occupants, and operating posture), and an operation devices state (such as installation position, operation form, and use frequency).

(6) The present invention can be carried out in other forms obtained by variously modifying the embodiment by a person skilled in the art without departing from the gist of the present invention, and the present invention encompasses such modifications.

SUMMARY

The features of the embodiment are summarized as follows.

A vehicle control apparatus according to one aspect includes: a plurality of operation devices; a plurality of reaction applying devices; a plurality of driving devices, and control device. The plurality of operation devices receive operations from an occupant. The plurality of reaction applying devices apply reaction forces to the occupant in accordance with respective operation quantities of the plurality of operation devices. The plurality of driving devices generate response quantities of a vehicle in accordance with the respective operation quantities of the plurality of operation devices. The control device is controls the plurality of reaction applying devices and the plurality of driving devices.

In this aspect, when the occupant operates preceding operation devices and subsequently operates subsequent operation devices different from the preceding operation devices, the control device causes a reactive perception quantity that is perceived by the occupant when the occupant starts operating the subsequent operation devices to substantially match a reactive perception quantity that is perceived by the occupant when the occupant finishes operating the preceding operation devices.

In the vehicle control apparatus, the reactive perception quantity that is perceived by the occupant when the occupant starts operating the subsequent operation devices are caused to substantially match the reactive perception quantity that is perceived by the occupant when the occupant finishes operating the preceding operation devices. Consequently, even when the occupant operates different operation devices, the continuity can be applied to the reactive perception quantities perceived by the occupant, thereby eliminating an uncomfortable operation feeling of the occupant.

The vehicle control apparatus according to another aspect has the configuration in which the control device controls the reaction applying devices such that the operation quantity of the operation devices and the reactive perception quantity, which is perceived by the occupant when the occupant operates the operation devices, have linearity.

This configuration can secure the linearity between the operation quantity and the reactive perception quantity perceived by the occupant, thereby further improving the operability of the operation devices.

The vehicle control apparatus according to another aspect has the configuration in which the control device controls the driving devices such that the operation quantity of the operation devices and a response perception quantity, which is perceived by the occupant when the occupant operates the operation devices, have linearity.

This configuration can secure the linearity between the operation quantity and the response perception quantity perceived by the occupant, thereby further improving the operability of the vehicle.

The vehicle control apparatus according to another aspect has the configuration in which the response perception quantity is set to be linear with respect to the reactive perception quantity.

This configuration can secure the linearity between the reactive perception quantity perceived by the occupant through somatic sensation and the response perception quantity perceived by the occupant through visual sensation and somatic sensation, thereby achieving comfortable vehicle controllability.

The vehicle control apparatus according to another aspect has the configuration in which the plurality of operation devices include at least one of arm system operation devices capable of being operated with a hand/arm and leg system operation devices capable of being operated with a foot/leg.

This configuration can eliminate an uncomfortable feeling even in a cooperative operation of any one of the arm system operation devices and the leg system operation devices.

The vehicle control apparatus according to another aspect has the configuration in which the arm system operation devices include at least one of a steering wheel, a shift lever, a parking lever, and various kinds of operation switches, and the leg system operation devices include at least one of an accelerator pedal, a brake pedal, and a clutch pedal.

This configuration can eliminate an uncomfortable operation feeing in a cooperative operation among basic operations including a traveling operation, a turning operation, and a braking operation.

This application is based on Japanese Patent application No. 2016-099456 filed in Japan Patent Office on May 18, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle control apparatus, comprising:

a plurality of operation devices which are constituted so as to be operable by an occupant;

a plurality of reaction applying devices those apply reaction forces via the operation device to the occupant in accordance with respective operation quantities of the plurality of operation devices;

a plurality of driving devices those generate response quantities of a vehicle in accordance with the respective operation quantities of the plurality of operation devices; and a control device that controls the plurality of reaction applying devices and the plurality of driving devices, wherein, when the occupant operates preceding operation devices and subsequently operates subsequent operation devices different from the preceding operation devices, the control device causes a subsequent reactive perception quantity that is equivalent to a quantity of a reaction force which will be perceived by the occupant when the occupant starts operating the subsequent operation devices to substantially match a preceding reactive perception quantity that is equivalent to a quantity of a reaction force which is perceived by the occupant when the occupant finishes operating the preceding operation devices.

2. The vehicle control apparatus according to claim 1, wherein the control device controls the reaction applying devices such that the relationship between the operation quantity of the operation devices and the reactive perception quantity, which is perceived by the occupant when the occupant operates the operation devices, has linearity.

3. The vehicle control apparatus according to claim 2, wherein the control device controls the driving devices such that the relationship between the operation quantity of the operation devices and a response perception quantity, which is perceived by the occupant through visual sensation and somatic sensation when the occupant operates the operation devices, has linearity.

4. The vehicle control apparatus according to claim 3, wherein the response perception quantity is set so that the relationship between the response perception quantity and the reactive perception quantity has linearity.

5. The vehicle control apparatus according to claim 4, wherein the plurality of operation devices include at least one of arm system operation devices capable of being operated with a hand/arm and leg system operation devices capable of being operated with a foot/leg.

6. The vehicle control apparatus according to claim 5, wherein the arm system operation devices include at least one of a steering wheel, a shift lever, a parking lever, and operation switches in the vehicle, and the leg system operation devices include at least one of an accelerator pedal, a brake pedal, and a clutch pedal.

7. The vehicle control apparatus according to claim 3, wherein the plurality of operation devices include at least one of arm system operation devices capable of being operated with a hand/arm and leg system operation devices capable of being operated with a foot/leg.

8. The vehicle control apparatus according to claim 7, wherein the arm system operation devices include at least one of a steering wheel, a shift lever, a parking lever, and operation switches in the vehicle, and the leg system operation devices include at least one of an accelerator pedal, a brake pedal, and a clutch pedal.

9. The vehicle control apparatus according to claim 2, wherein the plurality of operation devices include at least one of arm system operation devices capable of being operated with a hand/arm and leg system operation devices capable of being operated with a foot/leg.

10. The vehicle control apparatus according to claim 9, wherein the arm system operation devices include at least one of a steering wheel, a shift lever, a parking lever, and operation switches in the vehicle, and the leg system operation devices include at least one of an accelerator pedal, a brake pedal, and a clutch pedal.

11. The vehicle control apparatus according to claim 1, wherein the control device controls the driving devices such that the relationship between the operation quantity of the operation devices and a response perception quantity, which is perceived by the occupant when the occupant operates the operation devices, has linearity.

12. The vehicle control apparatus according to claim 11, wherein the response perception quantity is set so that the relationship between the response perception quantity and the reactive perception quantity has linearity.

13. The vehicle control apparatus according to claim 12, wherein the plurality of operation devices include at least one of arm system operation devices capable of being operated with a hand/arm and leg system operation devices capable of being operated with a foot/leg.

14. The vehicle control apparatus according to claim 13, wherein the arm system operation devices include at least one of a steering wheel, a shift lever, a parking lever, and operation switches in the vehicle, and the leg system operation devices include at least one of an accelerator pedal, a brake pedal, and a clutch pedal.

15. The vehicle control apparatus according to claim 11, wherein the plurality of operation devices include at least one of arm system operation devices capable of being operated with a hand/arm and leg system operation devices capable of being operated with a foot/leg.

16. The vehicle control apparatus according to claim 15, wherein the arm system operation devices include at least one of a steering wheel, a shift lever, a parking lever, and operation switches in the vehicle, and the leg system operation devices include at least one of an accelerator pedal, a brake pedal, and a clutch pedal.

17. The vehicle control apparatus according to claim 1, wherein the plurality of operation devices include at least one of arm system operation devices capable of being operated with a hand/arm and leg system operation devices capable of being operated with a foot/leg.

18. The vehicle control apparatus according to claim 17, wherein the arm system operation devices include at least one of a steering wheel, a shift lever, a parking lever, and operation switches in the vehicle, and the leg system operation devices include at least one of an accelerator pedal, a brake pedal, and a clutch pedal.

* * * * *